April 28, 1931.          J. BETHUNE          1,803,294
                    POWER TRANSMISSION GEARING
                        Filed Sept. 3, 1929
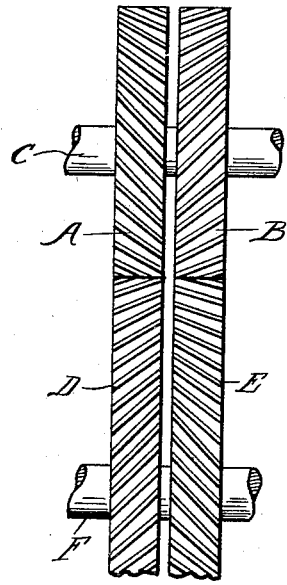
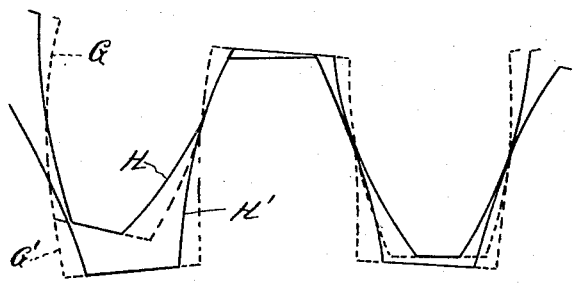
INVENTOR
John Bethune
BY Whittemore Hulbert
   Whittemore & Belknap
ATTORNEYS Patented Apr. 28, 1931

1,803,294

UNITED STATES PATENT OFFICE

JOHN BETHUNE, OF ROCHESTER, NEW YORK, ASSIGNOR TO REO MOTOR CAR COMPANY, OF LANSING, MICHIGAN, A CORPORATION OF MICHIGAN

POWER TRANSMISSION GEARING

Application filed September 3, 1929. Serial No. 390,033.

The invention relates to power transmission gearing and more particularly to that type in which the power is transmitted through a plurality of loaded gear trains having noise reducing differential characteristics. The present invention relates to a particular construction of this type, viz: one in which the teeth of the two trains are the same in circular pitch but are different in pressure angles. The invention therefore consists in the construction as hereinafter set forth.

In the drawings:

Figure 1 is a side elevation of a power transmission gearing embodying my invention;

Figure 2 is an enlarged end elevation showing the different pressure angles of the teeth of the gears in two trains.

It is well known in the gear art that where gears are running at a relatively high peripheral speed there is developed a sound or tone which rises in pitch as the speed is increased. It is also a fact that gears of different characteristics such as differences in circular pitch or in angle of teeth have individual tone producing qualities. I have discovered that where the power is transmitted through a plurality of gear trains having differential characteristics the sound produced is lessened, probably through interference between vibrations of different frequencies having a neutralizing effect on each other. Whether or not this is the true theory, it is a demonstrated fact that with such constructions noise production is lessened.

With the particular type of construction forming the subject matter of the present application, the differential characteristic is a difference in the pressure angles of the teeth of the two trains. Thus as shown in Figure 1, A and B are two gears mounted on the common shaft C, and D and E are the mating gears mounted on the shaft F. The two trains are of equal ratio and the teeth of the gears in the two trains are the same in circular pitch but differ in pressure angles. Thus for the train formed by the gears A and D the pressure angle of the teeth G G' may be ten degrees, and the teeth H H' of the gears B and E may have a pressure angle of twenty degrees. Thus by reason of this differential characteristic the periods of vibration in the two trains are different and tend to neutralize each other.

What I claim as my invention is:

1. The combination with a rotary drive member and a rotary driven member, of a gear train therebetween having a plurality of equal ratio simultaneously loaded gear train portions between said members, the teeth in the respective gear train portions having differential pressure angles, thereby reducing the noise of operation of said gear train.

2. The combination with a rotary drive member and a rotary driven member, of a gear train therebetween having a plurality of equal ratio simultaneously loaded gear train portions between said members with the teeth in both of said gear train portions being the same in circular pitch and the teeth in the respective gear train portions having different pressure angles thereby resulting in reduced noise of operation of said gear train.

3. The combination with a rotary drive member and a rotary driven member, of a gear train therebetween having a plurality of equal ratio simultaneously loaded helical gear train portions between said members, the teeth in the respective gear train portions having oppositely inclined helical angles and having different pressure angles.

4. A herringbone gear having the oppositely inclined teeth of different pressure angle.

5. A herringbone gear having the oppositely inclined teeth of the same helical angle and different pressure angle.

In testimony whereof I affix my signature.

JOHN BETHUNE.